United States Patent
Chang et al.

(10) Patent No.: US 10,650,212 B2
(45) Date of Patent: May 12, 2020

(54) OPTICAL IDENTIFICATION METHOD AND OPTICAL IDENTIFICATION SYSTEM

(71) Applicant: BEYOND TIME INVESTMENTS LIMITED, Eden Island, Mahé OT (SC)

(72) Inventors: Chu-Hsin Chang, Zhubei (TW); Jun-Shian Hsiao, Chupei (TW); Ju-Yu Yu, Chupei (TW); Chun-Fu Lin, Chupei (TW); Yu-Ming Cheng, Chupei (TW); Hui-Min Tsai, Taipei (TW)

(73) Assignee: BEYOND TIME INVETMENTS LIMITED, Eden Island (SC)

( * ) Notice: Subject to any disclaimer, the term of this patent is extended or adjusted under 35 U.S.C. 154(b) by 116 days.

(21) Appl. No.: 15/859,278

(22) Filed: Dec. 29, 2017

(65) Prior Publication Data

US 2018/0189541 A1    Jul. 5, 2018

Related U.S. Application Data

(60) Provisional application No. 62/440,746, filed on Dec. 30, 2016.

(30) Foreign Application Priority Data

Jul. 31, 2017    (TW) .............................. 106125696 A

(51) Int. Cl.
| | | |
|---|---|---|
| *G06K 9/00* | (2006.01) | |
| *G06K 9/64* | (2006.01) | |
| *G06K 9/46* | (2006.01) | |
| *G06K 9/48* | (2006.01) | |

(52) U.S. Cl.
CPC ......... *G06K 9/00013* (2013.01); *G06K 9/001* (2013.01); *G06K 9/0008* (2013.01); *G06K 9/00597* (2013.01); *G06K 9/4661* (2013.01); *G06K 9/48* (2013.01); *G06K 9/64* (2013.01); *G06K 2009/0006* (2013.01)

(58) Field of Classification Search
CPC ........... G06K 9/00013; G06K 9/00597; G06K 9/4661; G06K 9/64; G06K 9/48; G06K 9/001; G06K 9/0008; G06K 2009/0006
See application file for complete search history.

(56) References Cited

U.S. PATENT DOCUMENTS

| | | | | |
|---|---|---|---|---|
| 6,282,304 | B1 * | 8/2001 | Novikov | G06F 3/03543 340/5.83 |
| 8,554,518 | B1 * | 10/2013 | Claps | A61B 5/14532 702/189 |
| 9,690,972 | B1 * | 6/2017 | Chau | G06K 9/00093 |
| 2002/0031244 | A1 * | 3/2002 | Rozenberg | G06F 3/03543 382/124 |
| 2002/0031245 | A1 * | 3/2002 | Rozenberg | G06F 3/03543 382/125 |

(Continued)

*Primary Examiner* — Aaron W Carter
(74) *Attorney, Agent, or Firm* — Tung & Associates

(57) ABSTRACT

An optical identification method for sensing a physiological feature, includes: projecting light to a physiological portion for generating reflection light from the physiological portion; receiving the reflection light, to generate an image; generating slant pattern information according to the image; transforming the slant pattern information into a pattern identification matrix; and determining the physiological feature according to the pattern identification matrix.

15 Claims, 13 Drawing Sheets

(56) References Cited

U.S. PATENT DOCUMENTS

| | | | |
|---|---|---|---|
| 2006/0023921 A1* | 2/2006 | Saitoh | G06K 9/00067 |
| | | | 382/115 |
| 2008/0089563 A1* | 4/2008 | Yumoto | G06K 9/00087 |
| | | | 382/124 |
| 2011/0091113 A1* | 4/2011 | Ito | G06K 9/00248 |
| | | | 382/197 |
| 2016/0274670 A1* | 9/2016 | Sugaya | G06F 3/017 |
| 2017/0243042 A1* | 8/2017 | Walch | G06K 9/001 |
| 2018/0184927 A1* | 7/2018 | Chang | G06K 9/00885 |
| 2018/0189541 A1* | 7/2018 | Chang | G06K 9/0008 |
| 2018/0189546 A1* | 7/2018 | Chang | G06K 9/00107 |

* cited by examiner

Characteristic matrix     Mask matrix $$\begin{bmatrix} -1 & 0 & 1 \\ 0 & 0 & 0 \\ 1 & 0 & -1 \end{bmatrix}$$ Convolution $$\begin{bmatrix} 0 & 0 & 1 \\ 0 & 1 & 0 \\ 1 & 0 & 0 \end{bmatrix}$$ =2

Fig. 6A

Characteristic matrix     Mask matrix $$\begin{bmatrix} -1 & 0 & 1 \\ 0 & 0 & 0 \\ 1 & 0 & -1 \end{bmatrix}$$ Convolution $$\begin{bmatrix} 0 & 0 & 1 \\ 0 & 1 & 1 \\ 1 & 1 & 1 \end{bmatrix}$$ =1

Fig. 6B

Characteristic matrix $$\begin{pmatrix} -1 & 0 & 1 \\ 0 & 0 & 0 \\ 1 & 0 & -1 \end{pmatrix}$$

Convolution

Mask matrix $$\begin{pmatrix} 1 & 1 & 1 \\ 1 & 1 & 0 \\ 1 & 0 & 0 \end{pmatrix}$$

Characteristic matrix $$\begin{pmatrix} -1 & 0 & 1 \\ 0 & 0 & 0 \\ 1 & 0 & -1 \end{pmatrix}$$

Convolution

Mask matrix $$\begin{pmatrix} 1 & 0 & 0 \\ 0 & 1 & 0 \\ 0 & 0 & 1 \end{pmatrix}$$

Characteristic matrix

| -2 | -1 | 0 | 1  | 2  |
|----|----|---|----|----|
| -1 | -3 | 0 | 3  | 1  |
| 0  | 0  | 0 | 0  | 0  |
| 1  | 3  | 0 | -3 | -1 |
| 2  | 1  | 0 | -1 | -2 |

Convolution

Mask matrix

| 1 | 0 | 0 | 0 | 0 |
|---|---|---|---|---|
| 0 | 1 | 0 | 0 | 0 |
| 0 | 0 | 1 | 0 | 0 |
| 0 | 0 | 0 | 1 | 0 |
| 0 | 0 | 0 | 0 | 1 |

Characteristic matrix 2

| -2 | -1 | 0 | 1  | 2  |
|----|----|---|----|----|
| -1 | -3 | 0 | 3  | 1  |
| 0  | 0  | 0 | 0  | 0  |
| 1  | 3  | 0 | -3 | -1 |
| 2  | 1  | 0 | -1 | -2 |

Convolution

Mask matrix

| 1 | 1 | 0 | 0 | 0 |
|---|---|---|---|---|
| 0 | 1 | 1 | 0 | 0 |
| 0 | 0 | 1 | 1 | 0 |
| 0 | 0 | 0 | 1 | 1 |
| 0 | 0 | 0 | 0 | 1 |

Characteristic matrix

| -2 | -1 | 0 | 1 | 2 |
|---|---|---|---|---|
| -1 | -3 | 0 | 3 | 1 |
| 0 | 0 | 0 | 0 | 0 |
| 1 | 3 | 0 | -3 | -1 |
| 2 | 1 | 0 | -1 | -2 |

Convolution

Mask matrix

| 1 | 1 | 1 | 1 | 1 |
|---|---|---|---|---|
| 0 | 1 | 1 | 1 | 1 |
| 0 | 0 | 1 | 1 | 1 |
| 0 | 0 | 0 | 1 | 1 |
| 0 | 0 | 0 | 0 | 1 |

Characteristic matrix

| -2 | -1 | 0 | 1 | 2 |
|---|---|---|---|---|
| -1 | -3 | 0 | 3 | 1 |
| 0 | 0 | 0 | 0 | 0 |
| 1 | 3 | 0 | -3 | -1 |
| 2 | 1 | 0 | -1 | -2 |

Convolution

Mask matrix

| 0 | 0 | 0 | 0 | 1 |
|---|---|---|---|---|
| 0 | 0 | 0 | 1 | 0 |
| 0 | 0 | 1 | 0 | 0 |
| 0 | 1 | 0 | 0 | 0 |
| 1 | 0 | 0 | 0 | 0 |

Characteristic matrix 3

Slant mask matrix

Convolution

= X

Characteristic matrix

Horizontal mask matrix

| 1 | 2 | 0 | -2 | -1 |
| 4 | 8 | 0 | -8 | -4 |
| 6 | 12 | 0 | -12 | -6 |
| 4 | 8 | 0 | -8 | -4 |
| 1 | 2 | 0 | -2 | -1 |

Convolution

= GX

Characteristic matrix

Vertical mask matrix

| -1 | -4 | -6 | -4 | -1 |
| -2 | -8 | -12 | -8 | -2 |
| 0 | 0 | 0 | 0 | 0 |
| 2 | 8 | 12 | 8 | 2 |
| 1 | 4 | 6 | 4 | 1 |

Convolution

When $|X| \geq$ Slant threshold,

Slant information $= \begin{cases} 0, & \text{When } X \leq -\text{Slant threshold} \\ 3, & \text{When } X \geq \text{Slant threshold} \end{cases}$ When $|X| <$ Slant threshold, Orthogonal information $= \begin{cases} 1, & \text{When } |GX| \geq |GY| \\ 2, & \text{When } |GX| < |GY| \end{cases}$

| 1-bit information in the first comparison matrix | 1-bit information in the second comparison matrix | Exclusive OR XOR |
|---|---|---|
| 0 | 0 | 0 |
| 0 | 1 | 1 |
| 1 | 0 | 1 |
| 1 | 1 | 0 |

Fig. 10A

| 1-bit information in the first comparison matrix | 1-bit information in the second comparison matrix | Exclusive NOR XNOR |
|---|---|---|
| 0 | 0 | 1 |
| 0 | 1 | 0 |
| 1 | 0 | 0 |
| 1 | 1 | 1 |

Fig. 10B

OPTICAL IDENTIFICATION METHOD AND OPTICAL IDENTIFICATION SYSTEM

CROSS REFERENCE

The present invention claims priority to U.S. 62/440,746, filed on Dec. 30, 2016 and claims priority to TW 106125696 filed on Jul. 31, 2017.

BACKGROUND OF THE INVENTION

Field of Invention

The present invention relates to an optical identification method, especially an optical identification method of determining a physiological feature, according to slant pattern information in an image.

Description of Related Art

A prior art optical identification system, such as a capacitive fingerprint sensor system or a resistive fingerprint sensor system, has a high component cost. When a finger presses on the system, the system determines a center location of an area touched by the finger (finger pressing range) according to a geometrical shape of the finger pressing range. Such prior art needs to have a sensing range which is larger than the finger pressing range, such that the sensing range may have a space large enough for sensing a movement of the finger therein. However, nowadays the size of a handheld device is small, leaving very small space for accommodating its components. When the sensing range is smaller than the finger pressing range, there is currently no technique available for sensing a finger movement.

SUMMARY OF THE INVENTION

In one perspective, the present invention provides an optical identification method for sensing a physiological feature. The optical identification method includes: projecting light to a physiological portion for generating reflection light from the physiological portion; receiving the reflection light, to accordingly generate at least one image; generating slant pattern information according to the at least one image; transforming the slant pattern information into at least one pattern identification matrix; and determining the physiological feature according to the pattern identification matrix. The sensor unit includes a horizontal direction and a vertical direction, and the slant pattern information includes a positive slope pattern and/or a negative slope pattern, wherein the positive slope pattern includes a positive slope between zero and positive infinity with reference to the horizontal direction and the vertical direction, and the negative slope pattern includes a negative slope between zero and negative infinity with reference to the horizontal direction and the vertical direction.

In one embodiment, the physiological portion includes at least a part of a finger, a palm, or an iris, and the physiological feature includes a fingerprint, a finger motion trajectory, a gesture trajectory, a gesture direction, or an iris pattern.

In one embodiment, the image includes a pixel matrix, and the step of generating the slant pattern information according to the at least one image includes: obtaining a sample matrix in the pixel matrix, wherein the sample matrix includes a central pixel, and a plurality of pixels surrounding the central pixel, wherein the pixels surrounding the central pixel include an upper right corner pixel, a lower right corner pixel, an upper left corner pixel, and a lower left corner pixel with reference to the horizontal direction and the vertical direction; and generating the slant pattern information according to the sample matrix.

In one embodiment, the image includes a plurality of pixels arranged by rows and columns to form the pixel matrix, and the sample matrix including the central pixel, the upper right corner pixel, the lower right corner pixel, the upper left corner pixel, and lower left corner pixel forms a square matrix.

In one embodiment, the step of generating the slant pattern information according to the at least one image further includes: transforming the sample matrix into a characteristic matrix, wherein the characteristic matrix includes elements arranged by a plurality of horizontal element rows in the horizontal direction and the same plurality of vertical element columns in the vertical direction, wherein a sum of digital values of all the elements in the same horizontal element row equals zero, and a sum of digital values of all the elements in the same vertical element column equals zero.

In one embodiment, the step of generating the slant pattern information according to the at least one image further includes: generating the slant pattern information corresponding to each of the sample matrices, by a convolution operation between each of the characteristic matrices and a mask matrix.

In one embodiment, the step of transforming the slant pattern information into the at least one pattern identification matrix, includes: transforming the convolution value corresponding to each of the sample matrices, into an element of the at least one pattern identification matrix. In one embodiment, the step of transforming the slant pattern information into the at least one pattern identification matrix, includes: transforming the convolution value corresponding to each of the sample matrices, into a 1-bit data as the slant pattern information.

In one embodiment, the step of transforming the slant pattern information into the at least one pattern identification matrix, includes: transforming the slant pattern information of each of the sample matrices into an element of the pattern identification matrix, wherein a location of the element of the pattern identification matrix corresponds to a pixel location in the image.

In one embodiment, the optical identification method further includes: obtaining orthogonal pattern information corresponding to each of the sample matrix, the orthogonal pattern information including vertical pattern information related to a pattern in the vertical direction or horizontal pattern information related to a pattern in the horizontal direction; and transforming the slant information, the vertical pattern information, or the horizontal pattern information, into 2-bit information.

In one embodiment, the mask matrices further include a horizontal mask matrix and a vertical mask matrix. The step of obtaining the orthogonal pattern information corresponding to each of the sample matrix, includes: generating the orthogonal pattern information corresponding to each of the sample matrices, by a convolution operation between each of the characteristic matrices and a vertical mask matrix, or by a convolution operation between each of the characteristic matrices and a horizontal mask matrix.

In one embodiment, the at least one image includes a plurality of images, and the at least one pattern identification matrix includes a plurality of pattern identification matrices sequentially obtained according to the images. When the physiological portion includes a part of a finger, and the physiological feature is a finger motion trajectory, the step of determining the physiological feature according to the pattern identification matrix includes: determining the finger motion trajectory according to the pattern identification matrices.

In one embodiment, the pattern identification matrices include a first pattern identification matrix and a second pattern identification matrix obtained after the first pattern identification matrix, wherein the step of determining the finger motion trajectory according to the pattern identification matrices includes: obtaining a first comparison matrix in the first pattern identification matrix; obtaining a plurality of second comparison matrices in the second pattern identification matrix, wherein the second comparison matrices have the same matrix dimension as the first comparison matrix, and at various locations in the second pattern identification matrix; and comparing the 1-bit slant pattern information of the first comparison matrix with the 1-bit slant pattern information of the second comparison matrices, to determine the finger motion trajectory.

In one embodiment, the 1-bit slant pattern information is 0 or 1, and the step of comparing the 1-bit slant pattern information of the first comparison matrix with the 1-bit slant pattern information of the second comparison matrices includes: performing an exclusive OR or NOR operation between the 1-bit slant pattern information of every element in the first comparison matrix and the 1-bit slant pattern information of every corresponding element in each of the second comparison matrices, and determining a sum of the obtained exclusive OR or NOR operation results of each of the second comparison matrices, wherein the second comparison matrix with the lowest or highest sum is determined to correspond to the location of the finger motion trajectory in the second pattern identification matrix.

In one embodiment, when a lowest sum of the obtained exclusive OR operation results between the slant pattern information of the first comparison matrix and the second comparison matrices is lower than a similarity threshold, or when a highest sum of the obtained exclusive OR operation results between the slant pattern information of the first comparison matrix and the second comparison matrices is higher than a similarity threshold, the second comparison matrix with the lowest sum or the second comparison matrix with the highest sum is determined to correspond to the a location of the finger motion trajectory in the second pattern identification matrix.

In one embodiment, when the location of the finger motion trajectory determined according to the second comparison matrix is the same as the location of the finger motion trajectory determined according to the first comparison matrix in the first pattern identification matrix, a third pattern identification matrix is obtained after the second pattern identification matrix, and a plurality of third comparison matrices are obtained in the third pattern identification matrix which have the same matrix dimension as the second comparison matrix and at various locations in the third pattern identification matrix, to determine the finger motion trajectory between the first and third pattern identification matrices, according to the exclusive OR or NOR operation between the 1-bit slant pattern information of the first comparison matrix and the 1-bit slant pattern information of the third comparison matrix.

In one embodiment, the step of determining the finger motion trajectory according to the pattern identification matrices, further includes: obtaining a displacement (A1) between the first comparison matrix and the second comparison matrix by comparing the first and second comparison matrices, and determining the current location of the finger motion trajectory (B+A1×P1), by adding a product of the displacement (A1) multiplied by a weighting (P1) to a previous location (B) of finger motion trajectory at the time point obtaining the first comparison matrix, wherein the weighting (P1) correlates to the sum of the exclusive OR or NOR operation results between the 1-bit slant pattern information of the first comparison matrix and the 1-bit slant pattern information of the corresponding second comparison matrix, and wherein when the sum of the exclusive OR operation results is lower, the weighting is higher; when the sum of the exclusive OR operation results is higher, the weighting is lower; and wherein when the sum of the exclusive NOR operation results is lower, the weighting is lower; when the sum of the exclusive NOR operation results is higher, the weighting is higher.

In one embodiment, the step of determining the finger motion trajectory according to the pattern identification matrices, further includes: after obtaining the first comparison matrix, the second comparison matrices and the third comparison matrices, obtaining a plurality of fourth comparison matrices in the fourth pattern identification matrix obtained after the third pattern identification matrix, to respectively obtain the first displacement (A1) between the first comparison matrix and the second comparison matrices, a second displacement (A2) between the second comparison matrices and the third comparison matrices, and a third displacement (A3) between the third comparison matrices and the fourth comparison matrices; wherein when the first displacement (A1) and the third displacement (A3) have the same vertical and horizontal moving directions, and the second displacement (A2) has a reverse vertical moving direction of the aforementioned same vertical moving direction or a reverse horizontal moving direction of the aforementioned same horizontal moving direction, the finger motion trajectory (B+A1+A3) is obtained by adding the first displacement (A1) and the third displacement (A3) to the previous location (B) of finger motion trajectory at the time point obtaining the first comparison matrix, wherein the finger motion trajectory does not include the second displacement (A2).

In one perspective, the present invention provides an optical identification system for sensing a physiological feature. The optical identification system includes: a sensor, including a light source and a sensor unit, the light source being configured to operably project light to a physiological portion for generating reflection light from the physiological portion, the sensor unit being configured to operably receive the reflection light to generate at least one image; a pattern extractor, configured to operably generate slant pattern information according to the at least one image, and transforming the slant pattern information into at least one pattern identification matrix; and a calculation unit, configured to operably determine the physiological feature according to the pattern identification matrix; wherein the sensor unit includes a horizontal direction and a vertical direction, and the slant pattern information includes a positive slope pattern and/or a negative slope pattern, wherein the positive slope pattern includes a positive slope between zero and positive infinity with reference to the horizontal direction and the vertical direction, and the negative slope pattern includes a negative slope between zero and negative infinity with reference to the horizontal direction and the vertical direction.

In one embodiment, the physiological portion includes at least a part of a finger, a palm, or an iris, and the physiological feature includes a fingerprint, a finger motion trajectory, a gesture trajectory, a gesture direction, or an iris pattern.

In one embodiment, the pattern extractor further obtains orthogonal pattern information according to the at least one image, wherein the orthogonal pattern information includes vertical pattern information related to a pattern in the vertical direction or horizontal pattern information related to a pattern in the horizontal direction; wherein the pattern extractor transforms the slant pattern information and the orthogonal pattern information into the pattern identification matrices, for determining the physiological feature.

The objectives, technical details, features, and effects of the present invention will be better understood with regard to the detailed description of the embodiments below.

BRIEF DESCRIPTION OF THE DRAWINGS

FIGS. 6A, 6B, 6C, and 6D, show convolution operations between characteristic matrices and slant mask matrices according to several embodiments of the present invention.

FIGS. 7A, 7B, 7C, and 7D, show convolution operations between characteristic matrices and slant mask matrices according to several embodiments of the present invention.

FIGS. 8A and 8B, show convolution operation between characteristic matrices and different mask matrices according to several embodiments of the present invention.

FIGS. 10A and 10B show 1-bit logic operations according to two embodiments of the present invention.

DESCRIPTION OF THE PREFERRED EMBODIMENTS

The drawings as referred to throughout the description of the present invention are for illustrative purpose only, to show the interrelations between the components, but not drawn according to actual scale.

Figure 1:
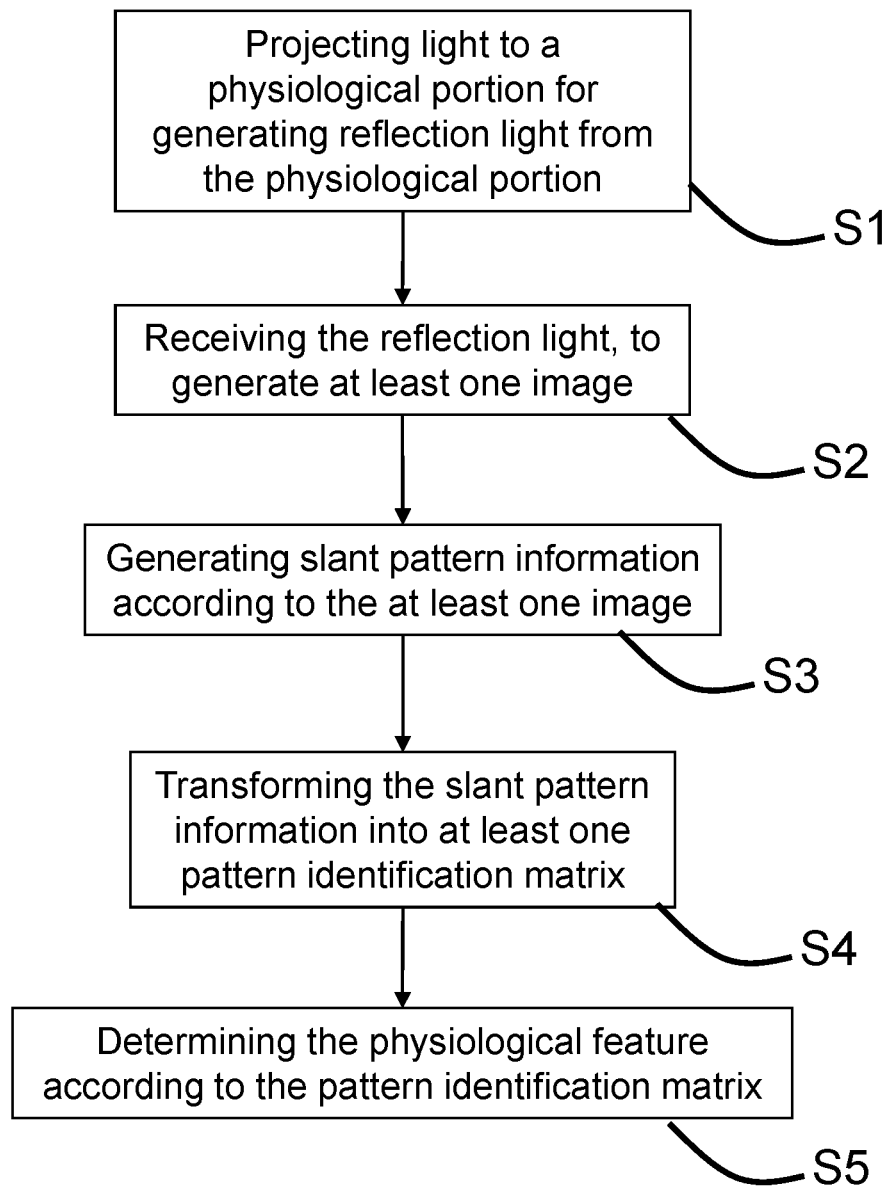
FIG. 1 shows a flowchart of an optical identification method according to one embodiment of the present invention.

Please refer FIG. 1; in one perspective, the present invention provides an optical identification method for sensing a physiological feature. The optical identification method includes: projecting light to a physiological portion for generating reflection light from the physiological portion (S1); receiving the reflection light, to generate at least one image accordingly (S2); generating slant pattern information according to the at least one image (S3); transforming the slant pattern information into at least one pattern identification matrix (S4); and determining the physiological feature according to the pattern identification matrix (S5).

In one embodiment, the physiological portion includes a finger, a palm, or an iris, and the physiological feature includes a fingerprint, a finger motion trajectory, a gesture trajectory, a gesture direction, or an iris pattern.

Figure 2:
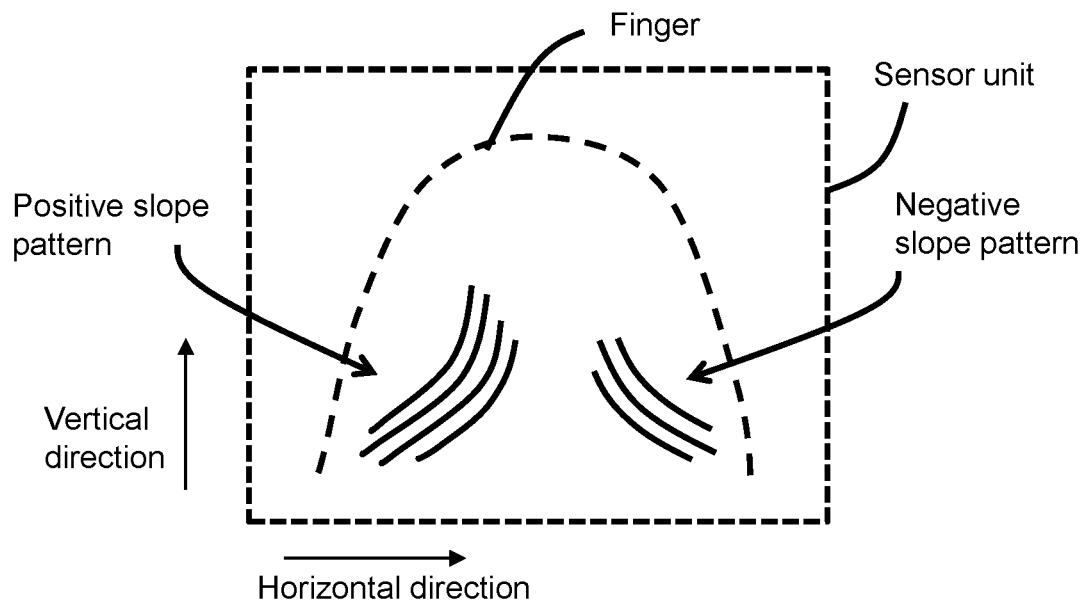
FIG. 2 shows a slant pattern in a fingerprint according to one embodiment of the present invention.

Please refer to FIG. 2; as an illustrative example, the physiological portion is shown as a finger. The finger includes a fingerprint, and the fingerprint can be classified into three typical types of patterns: whorl, loop, and arch fingerprint patterns. The whorl fingerprint pattern is a classification including circular, oval, and spiral patterns. The loop fingerprint pattern is a classification including triangle patterns. The arch fingerprint pattern is a classification including wavy patterns. In each of the whorl, loop, and arch fingerprint patterns, a large portion of the pattern is slant pattern (that is, pattern including slant lines with reference to a horizontal direction and a vertical direction, wherein the slant lines are neither in the horizontal direction nor in the vertical direction). The shape and distribution of the slant pattern of one fingerprint is different from another, so a finger motion trajectory determined according to the slant pattern will have a high accuracy and low likelihood of misjudgment. The slant pattern information obtained according to the slant pattern of a fingerprint indicates information about the slant lines which are neither in the horizontal direction nor in the vertical direction.

Referring to FIG. 2, according to the definition proposed by the present invention, there are positive slope patterns and negative slope patterns. The positive slope pattern includes one or more slope lines with a higher right side and a lower left side, with reference to the horizontal direction and the vertical direction in the figure. The negative slope pattern includes one or more slope lines with a lower right side and a higher left side, with reference to the horizontal direction and the vertical direction in the figure. According to one embodiment of the present invention, the slant pattern information of a fingerprint includes positive slope pattern information corresponding to the positive slope pattern in the fingerprint and negative slope pattern information corresponding to the negative slope pattern in the fingerprint.

Figure 3:
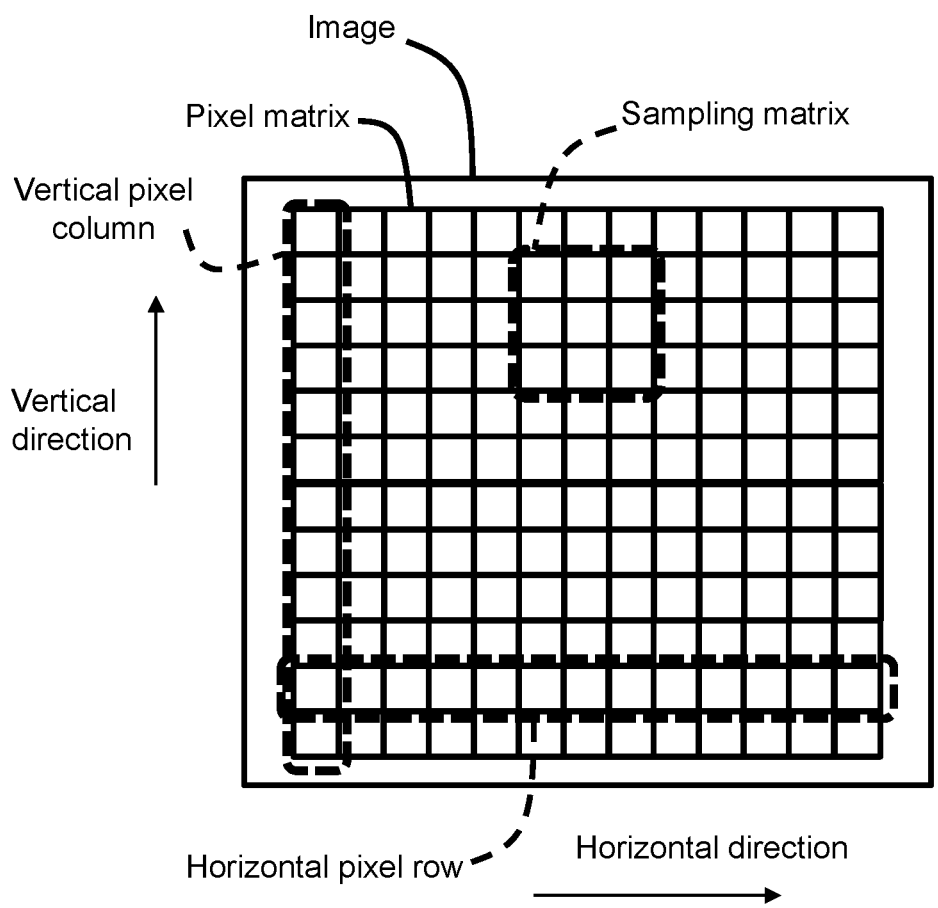
FIG. 3 shows a pixel matrix and a sample matrix therein according to one embodiment of the present invention.
Figure 4:
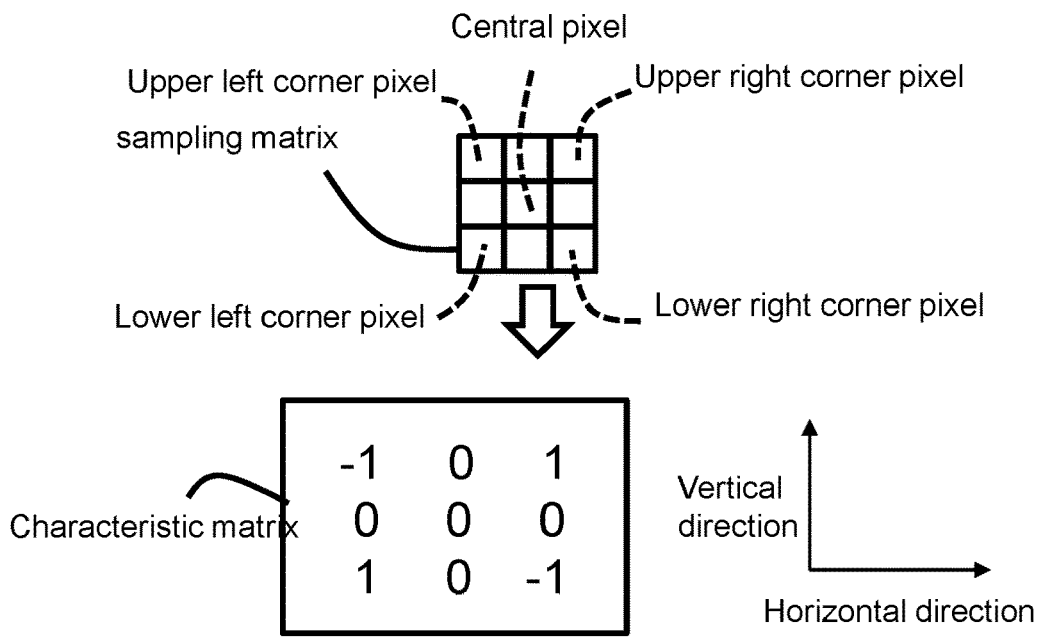
FIGS. 4 and 5 show sample matrices and characteristic matrices obtained in the sample matrices according to two embodiments of the present invention.
Figure 5:
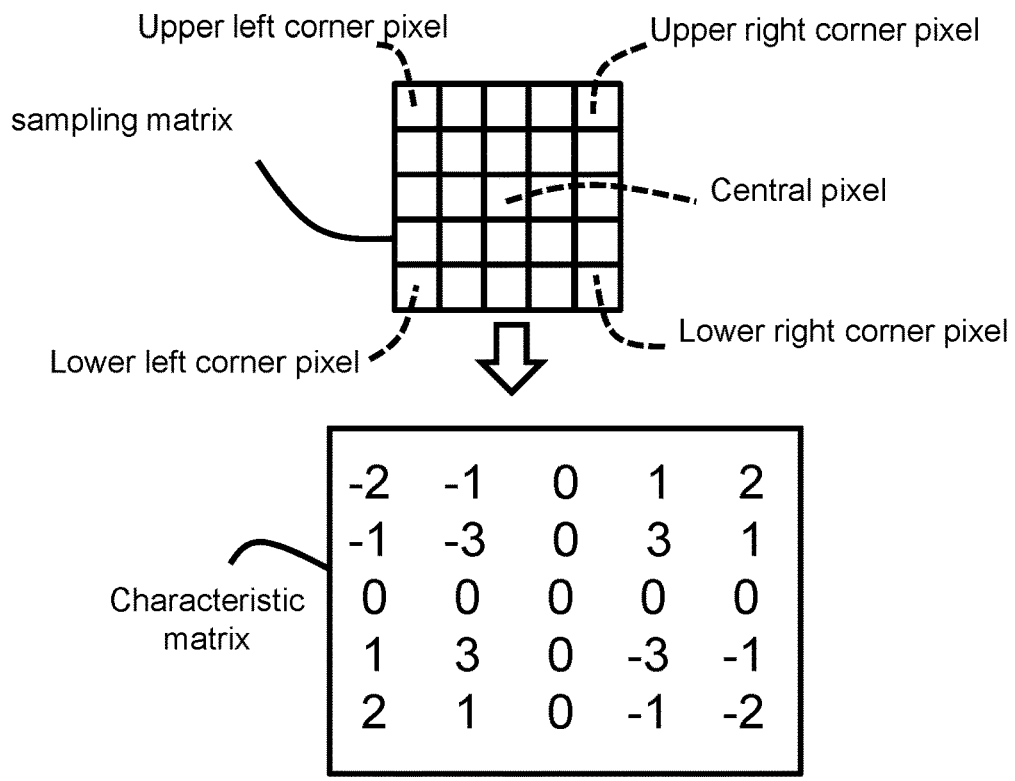

Please refer to FIGS. 3, 4 and 5, wherein the image includes (or is expressed by) a pixel matrix. In one embodiment, the aforementioned step of generating the slant pattern information according to the at least one image, includes: obtaining a sample matrix in the pixel matrix, wherein the sample matrix includes a central pixel, and a plurality of pixels surrounding the central pixel, wherein the pixels surrounding the central pixel include an upper right corner pixel, a lower right corner pixel, an upper left corner pixel, and a lower left corner pixel with reference to the horizontal direction and the vertical direction; and generating the slant pattern information according to the sample matrix. The central pixel is located at the center of the sample matrix, but it can be any location in the pixel matrix; the slant pattern information obtained according to the sample matrix represents fingerprint information corresponding to the location where the center of the sample matrix is at. The slant pattern information corresponding to various locations in the pixel matrix may be obtained.

FIG. 4 shows one embodiment of the present invention, wherein the sample matrix is a 3×3 matrix. The sample matrix includes the central pixel and plural pixels surrounding the central pixel, wherein the pixels surrounding the central pixel include an upper right corner pixel, a lower right corner pixel, an upper left corner pixel, and a lower left corner pixel with reference to the horizontal direction and the vertical direction, whereas the sample matrix forms a square matrix. FIG. 5 shows another embodiment of the present invention, wherein the sample matrix is a 5×5 matrix. Similarly, the 5×5 sample matrix also has a central pixel, an upper right corner pixel, a lower right corner pixel, an upper left corner pixel, and an upper right corner pixel. The sample matrices of FIGS. 4 and 5 have different matrix dimensions. The dimensions of the sample matrix and the characteristic matrix can be decided according to requirements, which are not limited to the dimensions as shown in figures.

Referring to FIGS. 4 and 5, in one embodiment, the aforementioned step of generating slant pattern information according to the at least one image, includes: transforming the sample matrix into a characteristic matrix, wherein the characteristic matrix includes elements arranged by a plurality of horizontal element rows in the horizontal direction and the same plurality of vertical element columns in the vertical direction, wherein a sum of digital values of all the elements in the same horizontal element row equals zero, and a sum of digital values of all the elements in the same vertical element column equals zero. For example, in FIG. 4, the digital values of the elements in the uppermost horizontal element row of the characteristic matrix are 1, 0, and −1 respectively, and the sum of these digital values equals zero. For another example, the digital values of the elements in the leftmost vertical element column in the characteristic matrix are −1, 0, and 1 respectively, and the sum of these digital values equals zero. The transformation from the sample matrix to the characteristic matrix may be achieved by various methods, such as the "switch median filter" method, or other matrix transformation methods.

In the embodiments of FIGS. 6A, 6B and 6C, the aforementioned step of generating the slant pattern information according to the at least one image further includes: generating a convolution value corresponding to each of the sample matrices by a convolution operation between each of the characteristic matrices and a mask matrix. The convolution operation is to multiply the values of elements at corresponding locations in two matrices, and summing the products. For example, the convolution operation in FIG. 6A, is thus (sequentially from the upper left element to the lower right element): (−1×0)+0×0+1×1+0×0+0×1+0×0+1× 1+0×0+(−1×0)=2 (the convolution value). For illustration purpose, the characteristic matrices in FIGS. 6A, 6B and 6C are the same, while the mask matrices are different from each other, so the convolution values obtained by the convolution operations are different. Importantly, the element values along a diagonal from upper right to lower left of the mask matrices in FIGS. 6A, 6B and 6C are the same (for example, the element values can be 1, but not limited to 1). The mask matrices in FIGS. 6A, 6B and 6C belong to the same group of mask matrices, having an attribute indicating the same slope direction. That is, convolution operations between any of the mask matrices in FIGS. 6A, 6B and 6C and characteristic matrices having the same slope direction will generate the same feature, which can be used to determine the slope direction of a characteristic matrix. FIG. 6D shows another embodiment, wherein the element values along the diagonal from upper left to lower right of the mask matrix are 1, which is different from the diagonal direction in FIGS. 6A, 6B and 6C, and the convolution value between the characteristic matrix and the mask matrix and is −2. The mask matrix in FIG. 6D belongs to a group of mask matrices different from the mask matrices in FIGS. 6A, 6B and 6C. As shown by the above, for a given location of the image, a characteristic matrix having a central pixel corresponding to the location can be determined to have a positive slope direction or a negative slope direction according to a convolution operation between the characteristic matrix and the mask matrix, and corresponding positive slope pattern information or negative slope pattern information can be generated.

After transforming the sample matrix into the characteristic matrix and obtaining a convolution value corresponding to the sample matrix by a convolution operation between the characteristic matrix and the mask matrix, the resulted convolution value is transformed into the slant pattern information of a corresponding pixel location of the image (which is the central pixel of the sample matrix). A pattern identification matrix is formed when the slant pattern information of every pixel in the pattern identification matrix is defined. The pattern identification matrix can include the whole image or a significant portion of the image. The obtained pattern identification matrix may be used for example for the fingerprint or iris pattern identification, according to features or slant directions thereof. Further, when two or more pattern identification matrices are generated at different timings, the obtained pattern identification matrices can be used to determine the finger motion trajectory.

In the aforementioned embodiments, the sign (positive or negative) of the obtained convolution values are used to determine that the slant pattern information has a positive or negative slope. However, the present invention is not limited to this. For example, a convolution operation between the characteristic matrix and a horizontal mask matrix (or a vertical mask matrix) may be used to determine whether the pattern corresponding to the location of the central pixel of the sample matrix in the image is a horizontal pattern or a vertical pattern, which will be described in detail later.

In one embodiment, the aforementioned step of transforming the slant pattern information into the pattern identification matrix, includes: transforming the convolution value corresponding to each of the sample matrices into an element of the pattern identification matrix, to form the pattern identification matrix. In one embodiment, for simplifying the operation process, the convolution values corresponding to the sample matrices are transformed into a 1-bit data as the slant pattern information. For example, the transformation may be achieved by comparing each of the convolution values with a threshold. When a convolution value is higher than the threshold, the convolution value is transformed into 1. And, when a convolution value is lower than the threshold, the convolution value is transformed into 0. For example, when the threshold is 0, the convolution values obtained in FIGS. 6A, 6B, and 6C are transformed into 1, indicating the slant pattern corresponding to one direction, while the convolution value in FIG. 6D which is lower than the threshold is transformed into 0, indicating the slant pattern corresponding to the other direction. Thus, the 1-bit slant pattern information in the pattern identification matrix represents a slant pattern distribution of the image. The above is only one example, and in another embodiment, when a convolution value is higher than the threshold, the convolution value is transformed into 0; and, when a convolution value is lower than the threshold, the convolution value is transformed into 1. That is, the transformation of the convolution values into the slant pattern information can be decided differently according to different requirements.

The threshold is not necessarily 0, but can be another value, depending on the requirements.

The convolution operations shown in FIGS. 6A, 6B, 6C, and 6D are based on 3×3 matrices, but the present invention is not limited to this. The matrices of the convolution operation can have other dimensions, such as the 5×5 matrices shown in FIGS. 7A, 7B, 7C, and 7D, wherein the 5×5 matrices can also be used to determine whether the slant pattern of the characteristic matrices have the positive slope or the negative slope. Similarly, the characteristic matrices in FIGS. 7A, 7B, 7C, and 7D can also be transformed into 1-bit slant pattern information, and correspondingly transformed into the pattern identification matrix corresponding to the image.

In one embodiment, the optical identification method of the present invention further includes: obtaining orthogonal pattern information according to the image, the orthogonal pattern information including vertical pattern information related to a pattern in the vertical direction or horizontal pattern information related to a pattern in the horizontal direction; and transforming the convolution value corresponding to the sample matrix, into a 2-bit data representing the slant pattern information and the orthogonal pattern information. In the 2-bit information, for example, 0, 1, 2, and 3 (binary 00, 01, 10, and 11) may respectively correspond to the positive slope pattern information, the negative slope pattern information, the horizontal pattern information, and the vertical pattern information, wherein the correspondences are not necessarily as the described order. For example, 0 and 1 can respectively correspond to the positive slope pattern information and the negative slope pattern information; 2 and 3 can respectively correspond to the horizontal pattern information and the vertical pattern information. Or, 2 and 3 can respectively correspond to the positive slope pattern information and the negative slope pattern information; 0 and 1 can respectively correspond to the horizontal pattern information and the vertical pattern information. Importantly, the 2-bit information includes not only the positive and/or negative slope pattern information, but also include the horizontal pattern information and/or the vertical pattern information.

Besides the mask matrix for distinguishing a slant pattern ("slant mask matrix" hereinafter), in one embodiment, the mask matrices further include mask matrices for distinguishing an orthogonal pattern, namely a horizontal mask matrix and a vertical mask matrix to obtain the horizontal pattern information and the vertical pattern information corresponding to the sample matrix. The horizontal pattern information and the vertical pattern information are respectively obtained by convolution operations between the characteristic matrix and the horizontal mask matrix and between the characteristic matrix and the vertical mask matrix, to generate corresponding convolution values.

Please refer to FIG. 8A, wherein a 5×5 characteristic matrix, a slant mask matrix, a horizontal mask matrix and a vertical mask matrix are shown, wherein the elements in some of the matrices are simplified as dots. The horizontal mask matrix and the vertical mask matrix shown in the figure are examples for illustration purpose, but not to limit the element values in practical application. Details regarding the slant mask matrix have been described with reference to FIGS. 6A, 6B, 6C, 6D, 7A, 7B, 7C, and 7D, so they are not redundantly repeated here. In FIG. 8A, the convolution value between the characteristic matrix and the slant mask matrix is X; the convolution value between the characteristic matrix and the horizontal mask matrix is GX; the convolution value between the characteristic matrix and the vertical mask matrix is GY.

Figure 8B:
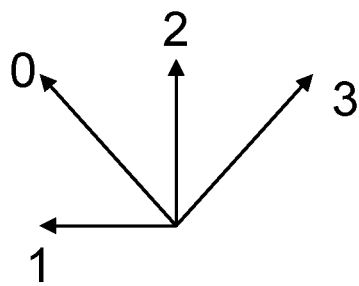

FIG. 8B shows one example of how to transform the convolution values between the characteristic matrix and the slant mask matrix, and between the characteristic matrix and the horizontal mask matrix, and between the characteristic matrix and the vertical mask matrix, into the 2-bit information. In FIG. 8B, a slant threshold is used to distinguish the convolution value between the characteristic matrix and the slant mask matrix, to determine whether it should be the positive slope pattern information (3 in the 2-bit information), or the negative slope pattern information (0 in the 2-bit information). More specifically: when the absolute value of the convolution value (|X|) is higher than the slant threshold, the characteristic matrix is determined to indicate a slant pattern; when the absolute value of the convolution value is lower than the slant threshold, the convolution value (GX) between the characteristic matrix and the horizontal mask matrix, and the convolution value (GY) between the characteristic matrix and the vertical mask matrix, are used to determine whether the characteristic matrix indicates a horizontal pattern (1 in the 2-bit information) or a vertical pattern (2 in the 2-bit information). Thus, the convolution values corresponding to the sample matrix may be transformed into the 2-bit information to represent the slant pattern information or the orthogonal pattern information. In more detail, when the absolute value of the convolution value between the characteristic matrix and the slant mask matrix is higher than the slant threshold, this characteristic matrix indicates a slant pattern. And, when the absolute value of the convolution value is lower than the slant threshold, it means that there is not an obvious slant pattern, so the characteristic matrix may be further determined to indicate a horizontal pattern or a vertical pattern, by the convolution operation with the horizontal mask matrix and with the vertical mask matrix. The element values of the horizontal mask matrix and the vertical mask matrix shown in FIG. 8 are for illustration purpose and can be modified.

In the aforementioned embodiment, when the physiological portion is a finger, the corresponding physiological feature may be a fingerprint. However, the physiological portion according to the present invention is not limited to the finger, but can be other physiological portions; for example, the physiological portion may be an iris or other physiological portions. When the physiological portion is an iris, the corresponding physiological feature may be an iris pattern. The irises of different persons have different pattern distributions, which also include the slant pattern information and/or the orthogonal pattern information at different locations. Therefore, the iris pattern can be used to identify the person's identity, similar to what have been described in the above referring to fingerprint.

In one embodiment, when the physiological portion is a finger, a finger motion trajectory can be determined according to plural pattern identification matrices obtained from plural sequential images, as described below.

Figure 9:
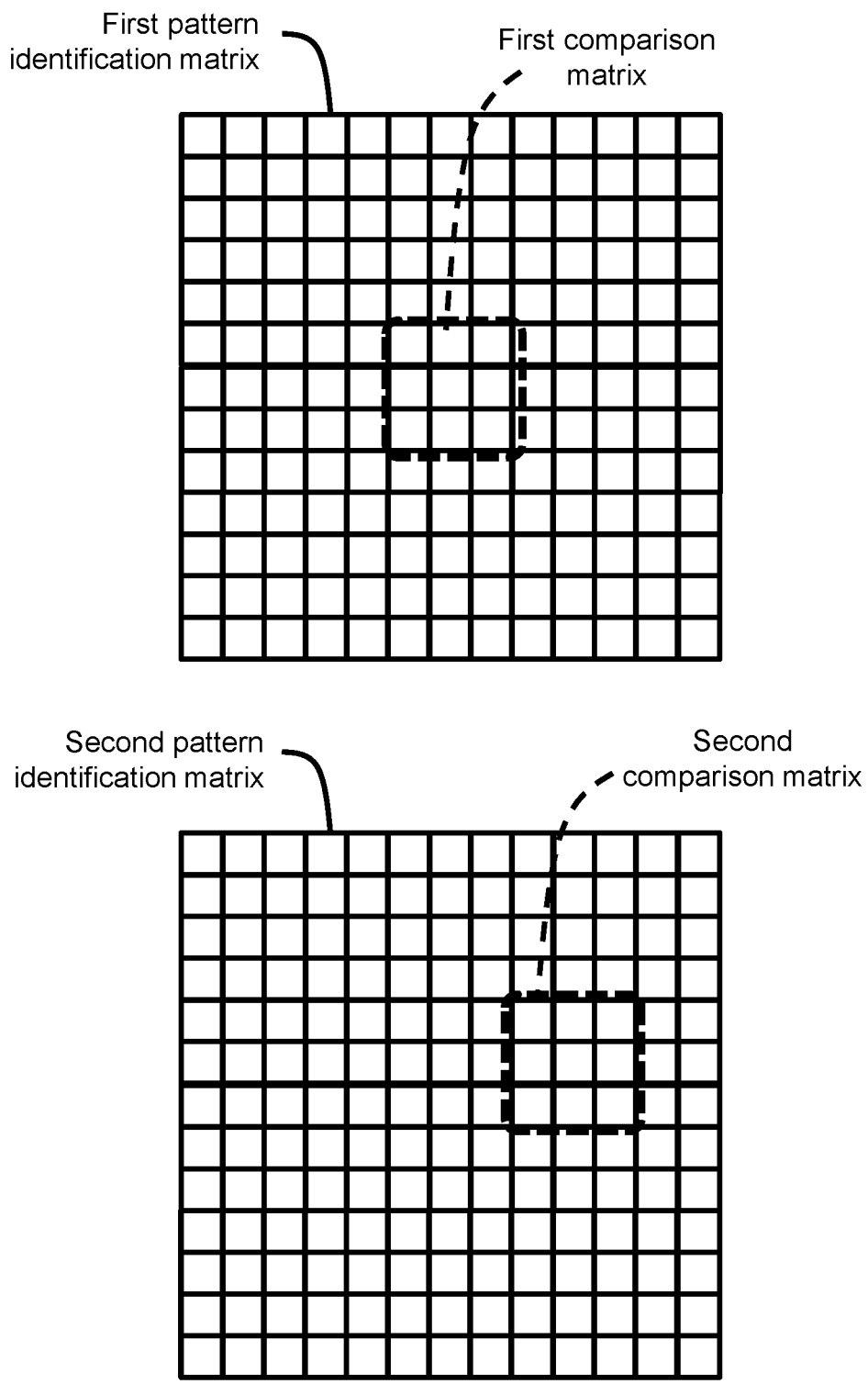
FIG. 9 shows a first pattern identification matrix and a second pattern identification matrix according to one embodiment of the present invention.

Referring to FIG. 9, in the embodiment shown in FIG. 9, the pattern identification matrices include a first pattern identification matrix and a second pattern identification matrix obtained after the first pattern identification matrix. The aforementioned step of determining the finger motion trajectory according to the sequentially obtained pattern identification matrices, includes: obtaining a first comparison matrix in the first pattern identification matrix; obtaining a plurality of second comparison matrices having the same matrix dimension as the first comparison matrix and at various locations in the second pattern identification matrix (only one second comparison matrix is shown in FIG. 9 as an example), and comparing the 1-bit slant pattern information of the first comparison matrix with the 1-bit slant pattern information of the second comparison matrices, to determine the finger motion trajectory. The aforementioned second comparison matrices are obtained at various locations in the second pattern identification matrix, and by the comparison between the first comparison matrix and the various second comparison matrices, a second comparison matrix which is most similar to the first comparison matrix is identified, for determining the finger motion trajectory.

The comparison between the first comparison matrix and the second comparison matrix can be achieved by various methods, such as by counting the number of similar elements in both comparison matrices, or by other methods. In one embodiment, the present invention provides a comparison method with exclusive OR operation, wherein the required process, circuit, and software, are very simple. The details are described below.

In one embodiment, the 1-bit slant pattern information is 0 or 1. The aforementioned step of comparing the 1-bit slant pattern information of the first comparison matrix with the 1-bit slant pattern information of the second comparison matrices, includes: performing an exclusive OR operation (FIG. 10A) between the 1-bit slant pattern information of every element in the first comparison matrix and the 1-bit slant pattern information of every corresponding element in each of the second comparison matrices, and determining a sum of the obtained exclusive OR operation results of each of the second comparison matrices, wherein the second comparison matrix with the lowest sum is determined to correspond to the location of the finger motion trajectory in the second pattern identification matrix.

More specifically, when the 1-bit slant pattern information of an element in the first comparison matrix and the 1-bit slant pattern information of a corresponding element in the second comparison matrix are the same (0 and 0, or 1 and 1), the exclusive OR operation result is 0 (a lower value); when the 1-bit slant pattern information of an element in the first comparison matrix and the 1-bit slant pattern information of a corresponding element in the second comparison matrix are different (1 and 0, or 0 and 1), the exclusive OR operation result is 1 (a higher value). Therefore, the second comparison matrix having the lowest sum among the exclusive OR operation results is the matrix in the second pattern identification matrix which is the most similar to the first comparison matrix. A relative movement from the location of the first comparison matrix in the first pattern identification matrix to the location of the second comparison matrix with the lowest sum in the second pattern identification matrix can be determined as the finger motion trajectory.

In another embodiment, by the same principle as the exclusive OR operation but with modification, the aforementioned step of comparing the 1-bit slant pattern information of the first comparison matrix with the 1-bit slant pattern information of the second comparison matrices, includes: performing the exclusive NOR (XNOR) operation (FIG. 10B) between the 1-bit slant pattern information of every element in the first comparison matrix and the 1-bit slant pattern information of every corresponding element in each of the second comparison matrices, and determining a sum of the obtained exclusive NOR operation results of each of the second comparison matrices, wherein the second comparison matrix having the highest sum (not the lowest sum in this embodiment) is determined to be a location of the finger motion trajectory in the second pattern identification matrix. When the 1-bit slant pattern information of an element of the first comparison matrix and the 1-bit slant pattern information of a corresponding element of the second comparison matrix are the same (0 and 0, or 1 and 1), the exclusive NOR operation result is 1 (a higher value); when the 1-bit slant pattern information of an element of the first comparison matrix and the 1-bit slant pattern information of a corresponding element of the second comparison matrix are different (1 and 0, or 0 and 1), the exclusive NOR operation result is 0 (a lower value). Therefore, the second comparison matrix with the highest sum is the matrix in the second pattern identification matrix which is the most similar to the first comparison matrix. A relative movement from the location of the first comparison matrix in the first pattern identification matrix to the location of the second comparison matrix with the highest sum in the second pattern identification matrix can be determined as the finger motion trajectory.

By a principle similar to the aforementioned "exclusive OR" and "exclusive NOR" operations of 1-bit slant pattern information, the 2-bit information can be used to determine which one of the second comparison matrices in the second pattern identification matrix is the most similar one to the first comparison matrix. For example, when the 2-bit information of an element of the first comparison matrix and the 2-bit information of the corresponding locations in the second comparison matrix are the same, the operation result is 0; when the 2-bit information of an element of the first comparison matrix and the 2-bit information of a corresponding element of the second comparison matrix are different, the operation result is 1. Therefore, the second comparison matrix with the lowest sum is the matrix in the second pattern identification matrix which is the most similar to the first comparison matrix. Or, when the operation result between same 2-bit information is 1, and the operation result between different 2-bit information is 0, the second comparison matrix with the highest sum is the matrix in the second pattern identification matrix which is the most similar to the first comparison matrix. Thus, a relative movement from the location of the first comparison matrix in the first pattern identification matrix to the location of the most similar second comparison matrix in the second pattern identification matrix can be determined as the finger motion trajectory.

In another embodiment, a similarity threshold is predetermined. The lowest sum of the exclusive OR operation results is compared with this similarity threshold, and when the lowest sum is lower than this similarity threshold, the second comparison matrix with the lowest sum is determined to correspond to the finger location in the second pattern identification matrix. It is possible that due to certain malfunctions (for example, an electronic noise in the internal circuit or a sudden brightness change in the external environment), the obtained image is not suitable for comparison or the obtained 1-bit slant pattern information of the first and/or the second comparison matrix or matrices are incorrect. By comparison with the similarity threshold, such inaccuracy can be found and filtered out. When the lowest sum of the exclusive OR operation results is higher than the similarity threshold, new first and second comparison matrices may be obtained and compared again, because it is highly possible that the previous comparison is inaccurate. When the lowest sum of the exclusive OR operation results is lower than the similarity threshold, then the accuracy is regarded acceptable and the finger motion trajectory can be determined according to the first and second comparison matrices. The value of the similarity threshold may be decided according to the environment, or the characteristics of the optical and electronic devices, etc. For example, when the light source is relatively brighter, the lowest sum obtained by the exclusive OR operations may be relatively higher. A proper similarity threshold can be determined according to the light source characteristics or, the brightness of the light source can be selected according to the similarity threshold.

In one embodiment, when the lowest sum among the obtained exclusive OR operation results between the 1 bit slant pattern information of the first comparison matrix and the second comparison matrices is higher than the similarity threshold, a third pattern identification matrix is obtained after the second pattern identification matrix, and a plurality of third comparison matrices having the same matrix dimension as the second comparison matrix are obtained in the third pattern identification matrix, at various locations in the third pattern identification matrix. A lowest sum among the exclusive OR operation results between the 1-bit slant pattern information of the second comparison matrix and the third comparison matrices is determined, and the finger motion trajectory from the second pattern identification matrix to the third pattern identification matrix is determined accordingly. As described above, when the lowest sum among the exclusive OR operation results between the 1 bit slant pattern information of the first comparison matrix and the second comparison matrices is higher than the similarity threshold, the comparison may be inaccurate. Hence, new comparison steps are performed to obtain a more reliable result, for determining the finger motion trajectory.

With respect to the embodiment using the exclusive NOR operation, when the highest sum of the exclusive NOR operation results is lower than the similarity threshold, new first and second comparison matrices may be obtained again, to perform the exclusive NOR operation again for determining the finger movement. When the highest sum of the exclusive NOR operation results is higher than the similarity threshold, the determined finger movement is regarded acceptable.

In one embodiment using the exclusive OR operation, when the location of the second comparison matrix with the lowest sum in the second pattern identification matrix is the same as the location of the first comparison matrix in the first pattern identification matrix, a third pattern identification matrix is obtained after the second pattern identification matrix, and a plurality of third comparison matrices having the same matrix dimension as the second comparison matrix are obtained in the third pattern identification matrix, at various locations in the third pattern identification matrix, to determine a lowest sum of the exclusive OR operation results between the slant pattern information of the second comparison matrix and the slant pattern information of the third comparison matrices, and to determine the finger motion trajectory from the first pattern identification matrix to the third pattern identification matrix accordingly. Because the location of the second comparison matrix with the lowest sum in the second pattern identification matrix is the same as the location of the first comparison matrix in the first pattern identification matrix, it means that there is no movement (for example, the relative movement is (0, 0)), or the finger is moving very slow. Therefore, obtaining the first comparison matrix and the third comparison matrices with a longer time period in between, may be more informative to decide the finger motion trajectory more accurately.

Figure 11:
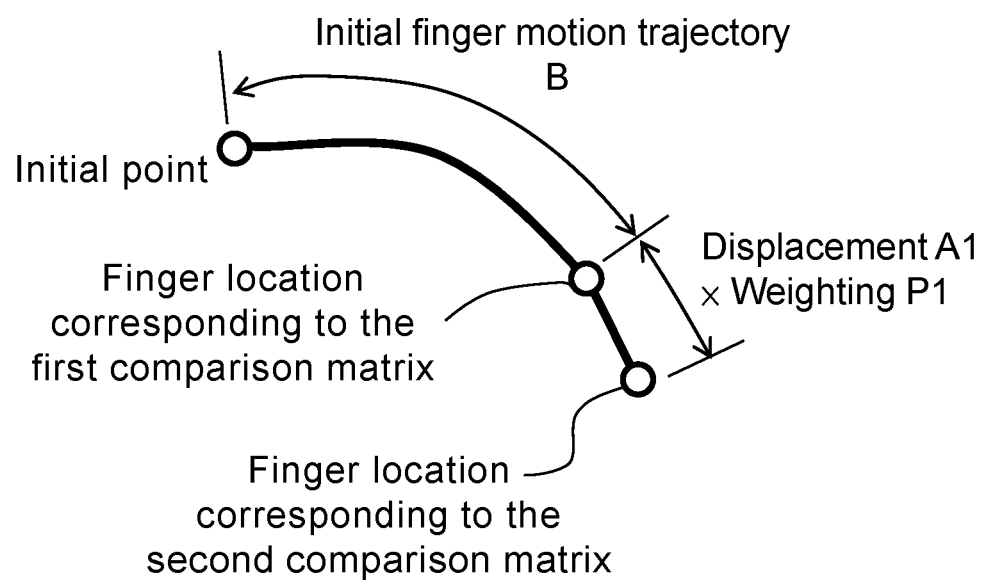
FIG. 11 shows determination of a finger motion trajectory according to one embodiment of the present invention.

FIG. 11 shows one embodiment of the present invention, wherein the aforementioned step of determining the finger motion trajectory according to the pattern identification matrices, further includes: obtaining a displacement (A1) between the first comparison matrix and the second comparison matrix by comparing the first and second comparison matrices, and determining the current location of the finger motion trajectory (B+A1×P1), by adding a product of the displacement (A1) multiplied by a weighting (P1) to a previous location (B) of finger motion trajectory at the time point obtaining the first comparison matrix, wherein the weighting (P1) correlates to the sum of the exclusive OR operation results between the 1-bit slant pattern information of the first comparison matrix and the 1-bit slant pattern information of the corresponding second comparison matrix. When the sum of the exclusive OR operation results is lower, the weighting is higher; when the sum of the exclusive OR operation results is higher, the weighting is lower.

More specifically, the displacement (A1) is obtained by an estimation process according to the first and second comparison matrices, but this estimation may be affected for example by the sense quality. For higher reliability, the weighting is used to adjust the result of the estimation. When the sum of the exclusive OR operation results is lower, the similarity between the two comparison matrices is higher, so the estimation reliability is higher and the weighting is higher, whereby the displacement (A1) contributes a higher proportion in the finger motion trajectory (B+A1×P1). When the sum of the exclusive OR operation results is higher, the similarity between the two comparison matrices is lower, so the estimation reliability is lower and the weighting is lower, whereby the displacement (A1) contributes a lower proportion in the finger motion trajectory (B+A1×P1).

It is apparent that the above can be applied to the correlation between the weighting and the sum of the exclusive NOR operations; in this case, when the sum of the exclusive NOR operation results is lower, the weighting is lower; when the sum of the exclusive NOR operation results is higher, the weighting is higher.

In one embodiment, the aforementioned step of determining the finger motion trajectory according to the pattern identification matrices, further includes: after obtaining the first comparison matrix, the second comparison matrices and the third comparison matrices, obtaining a plurality of fourth comparison matrices in the fourth pattern identification matrix obtained after the third pattern identification matrix, to respectively obtain the first displacement (A1) between the first comparison matrix and the second comparison matrices, a second displacement (A2) between the second comparison matrices and the third comparison matrices, and a third displacement (A3) between the third comparison matrices and the fourth comparison matrices; wherein when the first displacement (A1) and the third displacement (A3) have the same vertical and horizontal moving directions, and the second displacement (A2) has a reverse vertical moving direction of the aforementioned same vertical moving direction or a reverse horizontal moving direction of the aforementioned same horizontal moving direction, the finger motion trajectory (B+A1+A3) is obtained by adding the first displacement (A1) and the third displacement (A3) to the previous location (B) of finger motion trajectory at the time point obtaining the first comparison matrix, wherein the finger motion trajectory does not include the second displacement (A2).

As shown by the aforementioned embodiments, the present invention has an advantage that the physiological feature is determined by similarity comparison between matrices of pixels, and the required number of pixels for the comparison is few, so the required computation resources are few and circuit is simple.

Figure 12:
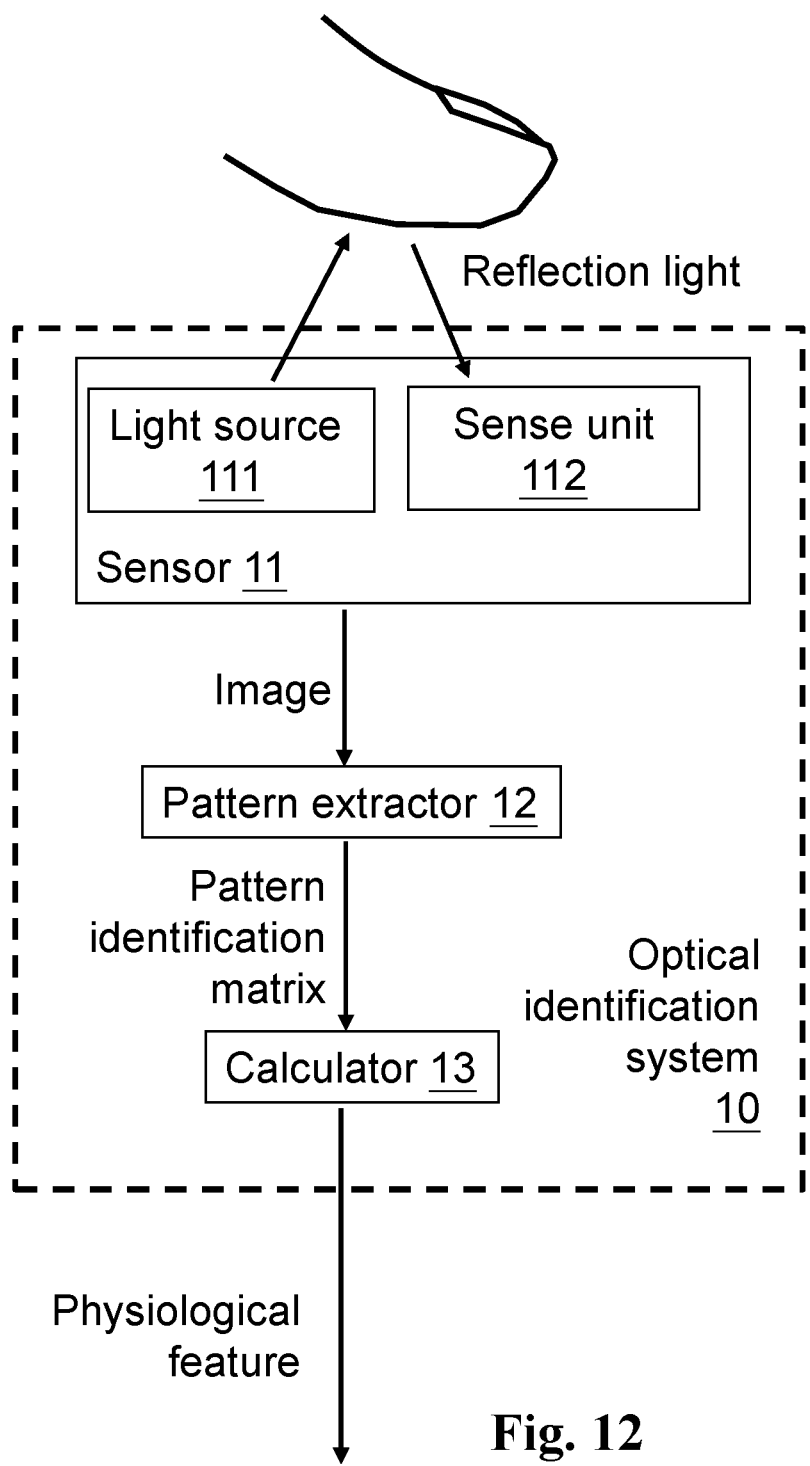
FIG. 12 shows an optical identification system according to one embodiment of the present invention.

In one perspective, the present invention provides an optical identification system 10, for sensing a physiological feature. Refer to FIG. 12, the optical identification system 10 includes: a sensor 11, including a light source 111 and a sensor unit 112, the light source 111 projecting light to a physiological portion for generating reflection light from the physiological portion, and the sensor unit 112 receiving the reflection light to accordingly generate a plurality of images;

a pattern extractor 12, for generating slant pattern information according to the images, and transforming the slant pattern information into a plurality of pattern identification matrices; and a calculation unit 13, for determining the physiological feature according to the pattern identification matrices.

In one embodiment, the physiological portion includes at least a part of a finger or an iris, and the corresponding physiological feature is a fingerprint, a finger motion trajectory, or an iris pattern. In another embodiment, the physiological portion includes at least a part of a palm, and the corresponding physiological feature includes a gesture trajectory, or a gesture direction.

In one embodiment, the pattern extractor 12 may further obtain orthogonal pattern information according to the images. The pattern extractor 12 may transform the slant pattern information and the orthogonal pattern information into pattern identification matrices, for determining the finger motion trajectory.

With respect to how the pattern extractor 12 generates the slant pattern information and/or the orthogonal pattern information according to the images, and how to transform the slant pattern information and/or the orthogonal pattern information into the pattern identification matrices, one can refer to the aforementioned method embodiments, which are not redundantly repeated here.

The present invention has been described in considerable detail with reference to certain preferred embodiments thereof. It should be understood that the description is for illustrative purpose, not for limiting the scope of the present invention. Those skilled in this art can readily conceive variations and modifications within the spirit of the present invention; for example, there may be additional steps or units inserted between two steps or units shown to be in direct connection in the embodiments, as long as such inserted steps or units do not affect the primary function of the steps or units of the present invention. Besides, an embodiment or a claim of the present invention does not need to attain or include all the objectives, advantages or features described in the above. The abstract and the title are provided for assisting searches and not to be read as limitations to the scope of the present invention. It is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. All such modifications and variations should fall within the scope of the present invention.

What is claimed is:

1. An optical identification method, for sensing a physiological feature, including:
    projecting light to a physiological portion for generating reflection light from the physiological portion;
    receiving the reflection light by a sensor unit, to accordingly generate at least one image;
    generating slant pattern information according to the at least one image;
    transforming the slant pattern information into at least one pattern identification matrix; and
    determining the physiological feature according to the pattern identification matrix;
    wherein the sensor unit includes a horizontal direction and a vertical direction, and the slant pattern information includes a positive slope pattern and/or a negative slope pattern, wherein the positive slope pattern includes a positive slope between zero and positive infinity with reference to the horizontal direction and the vertical direction, and the negative slope pattern includes a negative slope between zero and negative infinity with reference to the horizontal direction and the vertical direction;
    wherein the image includes a pixel matrix, and the step of generating the slant pattern information according to the at least one image includes: obtaining a sample matrix in the pixel matrix, wherein the sample matrix includes a central pixel, and a plurality of pixels surrounding the central pixel, wherein the pixels surrounding the central pixel include an upper right corner pixel, a lower right corner pixel, an upper left corner pixel, and a lower left corner pixel with reference to the horizontal direction and the vertical direction; and generating the slant pattern information according to the sample matrix;
    wherein the step of generating the slant pattern information according to the at least one image further includes: transforming the sample matrix into a characteristic matrix, wherein the characteristic matrix includes elements arranged by a plurality of horizontal element rows in the horizontal direction and the same plurality of vertical element columns in the vertical direction, wherein a sum of digital values of all the elements in the same horizontal element row equals zero, and a sum of digital values of all the elements in the same vertical element column equals zero.

2. The optical identification method of claim 1, wherein the physiological portion includes at least a part of a finger, a palm, or an iris, and the physiological feature includes a fingerprint, a finger motion trajectory, a gesture trajectory, a gesture direction, or an iris pattern.

3. The optical identification method of claim 1, wherein the image includes a plurality of pixels arranged by rows and columns to form the pixel matrix, and the sample matrix including the central pixel, the upper right corner pixel, the lower right corner pixel, the upper left corner pixel, and lower left corner pixel forms a square matrix.

4. The optical identification method of claim 1, wherein the step of generating the slant pattern information according to the at least one image further includes: generating multiple slant pattern information respectively corresponding to multiple sample matrices, each by a convolution operation between each of the characteristic matrices and a mask matrix.

5. The optical identification method of claim 4, wherein the step of generating the slant pattern information according to the at least one image further includes: transforming a convolution value resulting from the convolution operation into a 1-bit data, as the slant pattern information of the corresponding sample matrix.

6. The optical identification method of claim 4, wherein the step of transforming the slant pattern information into the at least one pattern identification matrix, includes: transforming the slant pattern information of each of the sample matrices into an element of the pattern identification matrix, wherein a location of the element of the pattern identification matrix corresponds to a pixel location in the image.

7. The optical identification method of claim 4, further including: obtaining orthogonal pattern information corresponding to each of the sample matrix, the orthogonal pattern information including vertical pattern information related to a pattern in the vertical direction or horizontal pattern information related to a pattern in the horizontal direction; and transforming the slant information, the vertical pattern information, or the horizontal pattern information, into 2-bit information.

8. The optical identification method of claim 7, wherein the step of obtaining the orthogonal pattern information corresponding to each of the sample matrix, includes: generating the orthogonal pattern information corresponding to each of the sample matrices, by a convolution operation between each of the characteristic matrices and a vertical mask matrix, or by a convolution operation between each of the characteristic matrices and a horizontal mask matrix.

9. An optical identification method, for sensing a physiological feature, including:
projecting light to a physiological portion for generating reflection light from the physiological portion;
receiving the reflection light by a sensor unit, to accordingly generate at least one image;
generating slant pattern information according to the at least one image;
transforming the slant pattern information into at least one pattern identification matrix; and
determining the physiological feature according to the pattern identification matrix;
wherein the sensor unit includes a horizontal direction and a vertical direction, and the slant pattern information includes a positive slope pattern and/or a negative slope pattern, wherein the positive slope pattern includes a positive slope between zero and positive infinity with reference to the horizontal direction and the vertical direction, and the negative slope pattern includes a negative slope between zero and negative infinity with reference to the horizontal direction and the vertical direction;
wherein the at least one image includes a plurality of images, and the at least one pattern identification matrix includes a plurality of pattern identification matrices sequentially obtained according to the images; wherein when the physiological portion includes at least a part of a finger, and the physiological feature is a finger motion trajectory, the step of determining the physiological feature according to the pattern identification matrix includes: determining the finger motion trajectory according to the pattern identification matrices;
wherein each of the images includes a pixel matrix, and the step of generating the slant pattern information according to the images further includes: obtaining a sample matrix in the pixel matrix, wherein the sample matrix includes a central pixel, and a plurality of pixels surrounding the central pixel, wherein the pixels surrounding the central pixel include an upper right corner pixel, a lower right corner pixel, an upper left corner pixel, and a lower left corner pixel with reference to the horizontal direction and the vertical direction; transforming the sample matrix into a characteristic matrix, wherein the characteristic matrix includes elements arranged by a plurality of horizontal element rows in the horizontal direction and the same plurality of vertical element columns in the vertical direction, wherein a sum of digital values of all the elements in the same horizontal element row equals zero, and a sum of digital values of all the elements in the same vertical element column equals zero; generating the slant pattern information corresponding to each of the sample matrices, by a convolution operation between each of the characteristic matrices and a mask matrix; and transforming a resulted convolution value corresponding to each of the sample matrices into 1-bit data as the slant pattern information.

10. The optical identification method of claim 9, wherein the pattern identification matrices include a first pattern identification matrix and a second pattern identification matrix obtained after the first pattern identification matrix, wherein the step of determining the finger motion trajectory according to the pattern identification matrices includes: obtaining a first comparison matrix in the first pattern identification matrix; obtaining a plurality of second comparison matrices in the second pattern identification matrix, wherein the second comparison matrices have the same matrix dimension as the first comparison matrix, and at various locations in the second pattern identification matrix; and comparing the 1-bit slant pattern information of the first comparison matrix with the 1-bit slant pattern information of the second comparison matrices, to determine the finger motion trajectory.

11. The optical identification method of claim 10, wherein the 1-bit slant pattern information is 0 or 1, and the step of comparing the 1-bit slant pattern information of the first comparison matrix with the 1-bit slant pattern information of the second comparison matrices includes: performing an exclusive OR or NOR operation between the 1-bit slant pattern information of every element in the first comparison matrix and the 1-bit slant pattern information of every corresponding element in each of the second comparison matrices, and determining a sum of the obtained exclusive OR or NOR operation results of each of the second comparison matrices, wherein the second comparison matrix with the lowest or highest sum is determined to correspond to the location of the finger motion trajectory in the second pattern identification matrix.

12. The optical identification method of claim 11, wherein a lowest sum of the obtained exclusive OR operation results or a highest sum of the obtained exclusive NOR operation results between the slant pattern information of the first comparison matrix and the second comparison matrices is compared with a similarity threshold, to determine whether the second comparison matrix with the lowest sum or highest sum corresponds to a current location of the finger motion trajectory; when the comparison with the similarity threshold shows negative, a third pattern identification matrix is obtained after the second pattern identification matrix, and a plurality of third comparison matrices are obtained in the third pattern identification matrix which have the same matrix dimension as the second comparison matrix and at various locations in the third pattern identification matrix, to determine a lowest sum of the exclusive OR operation results or a highest sum of the obtained exclusive NOR operation results between the slant pattern information of the second comparison matrix and the third comparison matrices, for determining the finger motion trajectory from the second pattern identification matrix to the third pattern identification matrix.

13. The optical identification method of claim 11, wherein when the location of the finger motion trajectory determined according to the second comparison matrix is the same as the location of the finger motion trajectory determined according to the first comparison matrix in the first pattern identification matrix, a third pattern identification matrix is obtained after the second pattern identification matrix, and a plurality of third comparison matrices are obtained in the third pattern identification matrix which have the same matrix dimension as the second comparison matrix and at various locations in the third pattern identification matrix, to determine the finger motion trajectory between the first and third pattern identification matrices, according to the exclusive OR or NOR operation between the 1-bit slant pattern information of the first comparison matrix and the 1-bit slant pattern information of the third comparison matrix.

14. The optical identification method of claim 12, wherein the step of determining the finger motion trajectory according to the pattern identification matrices, further includes: obtaining a displacement (A1) between the first comparison matrix and the second comparison matrix by comparing the first and second comparison matrices, and determining the current location of the finger motion trajectory (B+A1×P1), by adding a product of the displacement (A1) multiplied by a weighting (P1) to a previous location (B) of finger motion trajectory at the time point obtaining the first comparison matrix, wherein the weighting (P1) correlates to the sum of the exclusive OR or NOR operation results between the 1-bit slant pattern information of the first comparison matrix and the 1-bit slant pattern information of the corresponding second comparison matrix, and wherein when the sum of the exclusive OR operation results is lower, the weighting is higher; when the sum of the exclusive OR operation results is higher, the weighting is lower; and wherein when the sum of the exclusive NOR operation results is lower, the weighting is lower; when the sum of the exclusive NOR operation results is higher, the weighting is higher.

15. The optical identification method of claim 12, wherein the step of determining the finger motion trajectory according to the pattern identification matrices, further includes: after obtaining the first comparison matrix, the second comparison matrices and the third comparison matrices, obtaining a plurality of fourth comparison matrices in the fourth pattern identification matrix obtained after the third pattern identification matrix, to respectively obtain the first displacement (A1) between the first comparison matrix and the second comparison matrices, a second displacement (A2) between the second comparison matrices and the third comparison matrices, and a third displacement (A3) between the third comparison matrices and the fourth comparison matrices; wherein when the first displacement (A1) and the third displacement (A3) have the same vertical and horizontal moving directions, and the second displacement (A2) has a reverse vertical moving direction of the aforementioned same vertical moving direction or a reverse horizontal moving direction of the aforementioned same horizontal moving direction, the finger motion trajectory (B+A1+A3) is obtained by adding the first displacement (A1) and the third displacement (A3) to the previous location (B) of finger motion trajectory at the time point obtaining the first comparison matrix, wherein the finger motion trajectory does not include the second displacement (A2).

* * * * *